Dec. 5, 1972   V. G. HILL ET AL   3,705,248
MOLDING OF POWDERED OR GRANULAR MATERIAL
Filed April 15, 1970   4 Sheets-Sheet 1

INVENTORS.
VINCENT G. HILL
BY WILLIAM R. HARDING

ATTORNEY

INVENTORS.
VINCENT G. HILL
BY WILLIAM R. HARDING

ATTORNEY

United States Patent Office 3,705,248
Patented Dec. 5, 1972

3,705,248
MOLDING OF POWDERED OR GRANULAR
MATERIAL
Vincent G. Hill, Kingston, Jamaica, and William R. Harding, State College, Pa., assignors to The Carborundum Company, Niagara Falls, N.Y.
Filed Apr. 15, 1970, Ser. No. 28,845
Int. Cl. B28b 3/02, 5/02, 7/06, 7/10, 17/02
U.S. Cl. 264—294        3 Claims

ABSTRACT OF THE DISCLOSURE

Shaped articles (e.g., ceramic dishes) are molded from a moldable raw mix with a press which utilizes a separable rubber sheet within the female die. The rubber sheet (1) supports the mix to be molded; (2) distributes pressure uniformly during molding; and (3) releases the molded part from the female die after molding. The rubber sheet advantageously forms part of a conveyor belt. The use of a female die which is itself rubber, in addition to the rubber sheet, aids in pressure distribution during molding.

BACKGROUND OF THE INVENTION

This invention relates to the molding of powdered or granular or other moldable material in the field of metallurgy, ceramics, plastics and composites and also to equipment for carrying out such molding. In particular the invention is concerned with a novel method of molding shapes which are not normally made from powdered material. For example, shapes with a deep recess are commonly produced, in the case of metals, by deep drawing using suitable dies and high pressures. In the case of ceramic articles, such shapes are commonly slip cast, and in the case of plastics, the normal method is injection molding.

For the sake of convenience of explanation reference will be made hereinafter mainly to the ceramic art. Tablets, tiles, bricks and similar flat shapes are not difficult to produce from a suitable raw mix in powder or granular form usually though not always moistened with a little liquid and sometimes with the addition of temporary binder. However in the ceramic industry, when the article to be molded has a relatively deep recess (such as a cup or deeply recessed dish) or when the article required is relatively thin or has a particular configuration (such as a plate or saucer for tableware), molding is usually carried out using either a slip casting or plastic clay body technique.

The difficulties of using a conventional steel mold for molding recessed articles from a powdered ceramic mix, commonly called dust pressing, are first that of maintaining a uniform distribution of the mix prior to and during molding, and second that of achieving uniform pressure. Consequently dust-pressed, recessed (or other non-flat) shapes have uneven density and suffer from distortion, cracks or breakage during molding, stripping or subsequent kiln firing.

It is known that although dust-pressed fabrication of flatware, by which is meant plates and saucers, is not normal practice, research is in progress on that subject based on multi-station presses using steel molds. Any such solution to the problem, however, could not be applied to deeply recessed shapes.

SUMMARY OF THE INVENTION

According to one aspect of the present invention, a method of molding a shaped article from a moldable raw mix (e.g., a powdered or granular mix), comprises the steps of (1) distributing a layer of the mix on a rubber sheet; (2) positioning the sheet and mix over the lower female die of a mold; (3) bringing together the lower female die and a cooperating upper male die of the mold; (4) forming a shaped article from the mix in the mold under pressure; (5) separating the dies; and (6) removing the molded articles.

According to a further aspect of the present invention, there is provided a method utilizing apparatus for molding shaped articles from a moldable raw mix comprising (1) an upper male die; (2) a lower female die, the area between the upper and lower dies defining a molding position; (3) a rubber sheet in the form of a conveyor belt, arranged to travel through the molding position; (4) means for distributing the moldable mix on the rubber sheet in predetermined quantities and at spaced intervals; (5) means for moving the sheet, whereby (a) to carry the mix into the molding position for molding, and (b) to carry the molded article out of the molding position after molding; and (6) means for bringing the male and female dies together, whereby to mold the moldable mix into a shaped article.

The present invention possesses the advantages of (1) uniform mix distribution prior to and during molding; (2) uniform pressure distribution during molding; and (3) release of the molded part from the die by the spring action of the rubber sheet when the male die is retracted, leaving the molded article supported thereon. For an article of uniform cross-sectional thickness, the mix is uniformly spread on a rubber sheet, the sheet is positioned over the lower female die of a two-part mold, and the upper male die is brought down with pressure, thus pressing the mix and rubber sheet within the female die.

BRIEF DESCRIPTION OF THE DRAWING

FIG. 2 is a simplified sectional view on a larger scale of the mold shown in FIG. 1 in a closed position.

DETAILED DESCRIPTION

For the purpose of this invention the term "rubber" means, as used herein, any suitable natural or synthetic elastomeric material. Although developed particularly for deeply recessed articles, the invention is not limited thereto.

An embodiment of the invention will now be described, by way of example, to illustrate the invention.

Example 1

Figure 1:
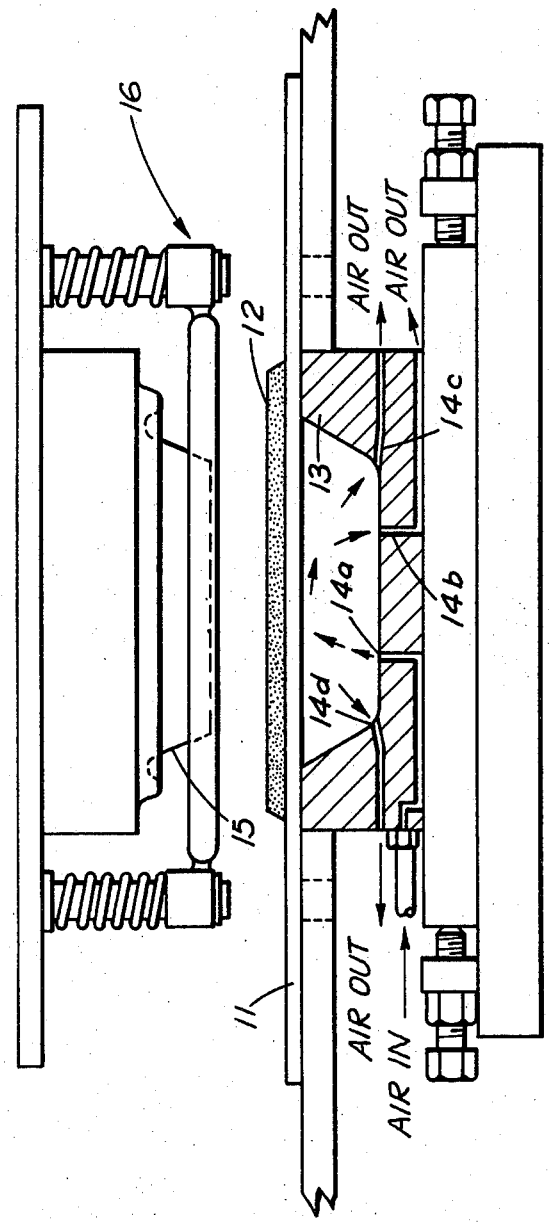
FIG. 1 is a sectional view of a molding station in an apparatus for molding shaped articles according to the present invention with the mold shown in an open position.

Referring now to FIGS. 1 and 2, an automated apparatus is used to produce once-fired, glazed earthenware rectangular dishes 17 x 11 cm., 2.8 cm. deep, with a wall thickness of 0.25 cm. Each dish weighs 110 gm. The sides of the dish incline outwards at an angle of 30° to the vertical.

An earthenware mix is prepared by conventional blunging and filter pressing followed by defluocculation and addition of water to form a 70% solids content slip which is spray dried to a moisture content of 7%–8% and a granule size of 250 microns and finer. The mix is metered out from a hopper (not shown) fitted with an adjustable gate (also not shown) which closes and opens as a conveyor belt 11 travels thereunder to provide five uniform layers 12 (only one of which is shown) of mix, each 25 x 18 and 0.6 cm. thick, spaced at 25 cm. intervals across the width of the belt 11 which is 140 cm. wide, 4 mm. thick and is formed of synthetic rubber having a 30–35 Shore durometer hardness on the A scale.

The belt 11 moves 55 cm., stops for 11 seconds, then moves forward another 55 cm., this cycle being continually repeated. When the belt 11 stops, five layers of mix are in the correct molding position over five female dies 13 (only one of which is shown). These female dies 13 each have six vent holes (only four of which, 14a–14d, are shown) one in each corner and two in the base. One of the holes, 14a, in the base is used to supply low pressure fluid, conveniently air, which effectively prevent sag of the rubber belt 11 when in the stationary position and carrying a layer 12 of mix immediately prior to pressing. The other five vent holes (14b–14d and two not shown) allow the air to escape and provide more effective control of the air pressure. Furthermore, these vent holes prevent compression of air under the rubber belt 11 during pressing. In addition, they allow air to reenter after release of pressure which assists the natural relaxation of the rubber belt 11 to its horizontal position.

The molding cycle starts when the belt 11 stops, followed by the automatic introduction of low pressure air, in turn followed by the descent of male dies 15 (only one of which is shown) which are silicone lubricated. As the male dies 15 descend they are each preceded by a spring-loaded clamping bar assembly 16 which firmly holds the rubber belt 11 along rectangular contours 32 x 25 cm. surrounding each of the five layers 12 of mix. This ensures that virtually all rubber belt movement during molding is confined to the five areas of 32 x 25 cm. which are trapped by the clamping bar assemblies 16.

When the male dies 15 descend, the rubber belt 11 and mix 12 is deformed to the shape of the cavity defined by the cooperating dies 15 and 13 (see FIG. 2). The mix which eventually forms the side walls of the dishes does not fall (or falls only to a limited non-critical extent) when portions of the rubber belt 11 are forced to an inclined position, since the male die 15 effectively traps the layer 12 of mix between itself and the rubber belt 11 before such fall can take place.

A particular feature of the design of the male die 15 is a curved nip 17 (FIG. 2) which forms the rim of the dish and also forms a seal, adjacent to the rim, between the male die 15 and the rubber belt 11 prior to application of full pressure. This has the added advantage of leaving a very thin molding flash to be removed in the subsequent towing operation.

Up to the point where the male die 15 has descended so as to trap all the mix, very little pressure has been transmitted to the mix but from this point onwards the desired pressure is quickly achieved and is extremely uniform on all parts of the mix. The pressure used in this example is 300 kg./cm.$^2$, held for 1 second. The uniformity of pressure is due to the isostatic effect of the rubber. In conventional isostatic molding, fluid pressure can be applied for example with an elastomeric envelope or surface so as to exert even pressure over the whole area of the article being molded. In the present invention, a similar effect is achieved without the expensive complications of fluid pressure.

After forming the dishes, the pressure is released and the male dies are retracted. The molded dishes release from the male dies is aided by the silicone mist lubricant. The rubber belt 11 relaxes to the horizontal position aided by the air passing through the vent holes 14a–14d in the female die 13 as mentioned above, and the dishes remain supported on the rubber belt 11.

The whole pressing cycle is 11 seconds, after which the rubber belt 11 moves forward, carrying the molded dishes and taking five more layers of mix to their molding stations. As molded dishes reach the end of the rubber belt 11, they are taken by transfer conveyors through the stages of automatic drying, towing, glazing, drying and firing to final inspection. The whole production unit can be controlled by the use of time switches, limit switches and motorized valves according to known automation techniques.

Figure 3:
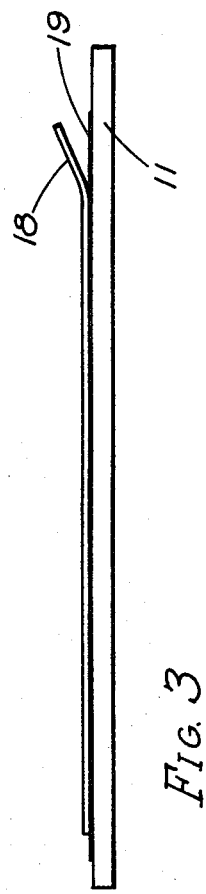
FIG. 3 is a side view showing an alternative construction of belt.

Several modifications and refinements come within the scope of the invention. For example, there is a problem with thin-walled sharp cornered articles. In such cases (see FIG. 3) a thin rubber sheet 18 on top of the main conveyor rubber belt 11 can be used, and if necessary a lubricant 19 such as talc, between the two sheets 11 and 18.

With sharp cornered articles rubber relaxation on release of molding pressure applies a stress to the underside of the article causing cracks in the vicinity of the corners. The use of the second thin rubber sheet 18 overcomes this problem.

Other modifications relating to the conveyor belt include the use of several individual belts passing through a multicavity molding unit instead of one wide belt.

In a preferred embodiment of the present invention, the female dies 13 are constructed of rubber, in addition to belt 11, so that an even better isostatic molding (i.e., a more even pressure distribution) is attained.

A major feature of the method described above is the slightly granular texture produced by the rubber on the underside of the molded article. This may be modified for aesthetic reasons by using specially patterned belts, e.g., woven or embossed designs or any desired configuration, provided only that it does not interfere with required pressing characteristics. The same effect may be achieved by using individual patterned rubbers placed on a plain conveyor belt or placed in recesses in a conveyor belt.

In the case of articles of non-uniform thickness a non-uniform layer of mix may be provided either by using special shaped rubbers or by using a thin belt over a vacuum forming unit which shapes and holds the rubber on to its surface by vacuum. The forming unit may be for one specific shape (as in the case of suction box 23 in FIG. 4) or it may be constructed so that any desired portion of the unit may be raised or lowered, thus temporarily causing a projection or a recess in the rubber. A layer of mix is then distributed over the rubber which layer will be non-uniform in thickness in the manner desired. The vacuum is released when the rubber assumes its normal flat position. The rubber carrying the mix in the desired non-uniform disposition passes forward for molding.

In a further modification of the present invention, finished articles having recesses or projections can be obtained by providing an initial uniform layer but one in which a lesser or greater mass of material is located at spaced locations in accordance with any desired pattern. The recesses or projections are formed at these locations in a subsequent molding operation.

In order to obtain these areas of greater mass, a former of a given pattern is employed to compress the material in accordance with that pattern and the recesses formed thereby are filled with additional powdered or granular material to again provide a layer of uniform thickness. The same effect can be obtained by initially providing a thicker layer than necessary, compressing portions of the layer by means of a patterned former and subsequently removing the uncompressed material down to the level of the compressed portions to once again provide a layer of uniform thickness having spaced denser portions.

For conventional flatware such as plates and saucers the granulated surface created by the rubber would in many cases not be desirable. More often a smooth finish is required, which may be obtained by machining the underside to the article.

Example 2

Figure 4:
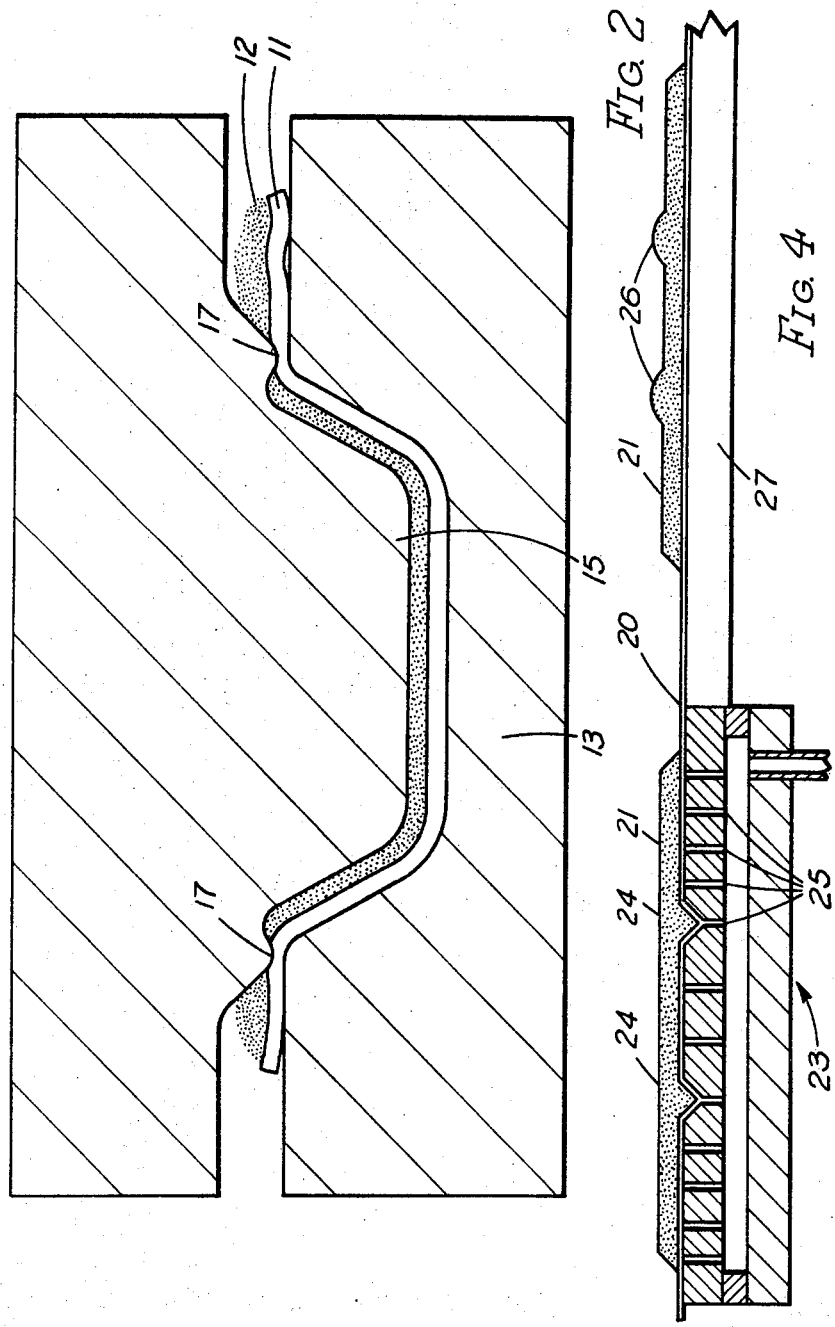
FIG. 4 is a sectional view of a mix distribution station in a modified form of apparatus for molding shaped articles according to the present invention.
Figure 5:
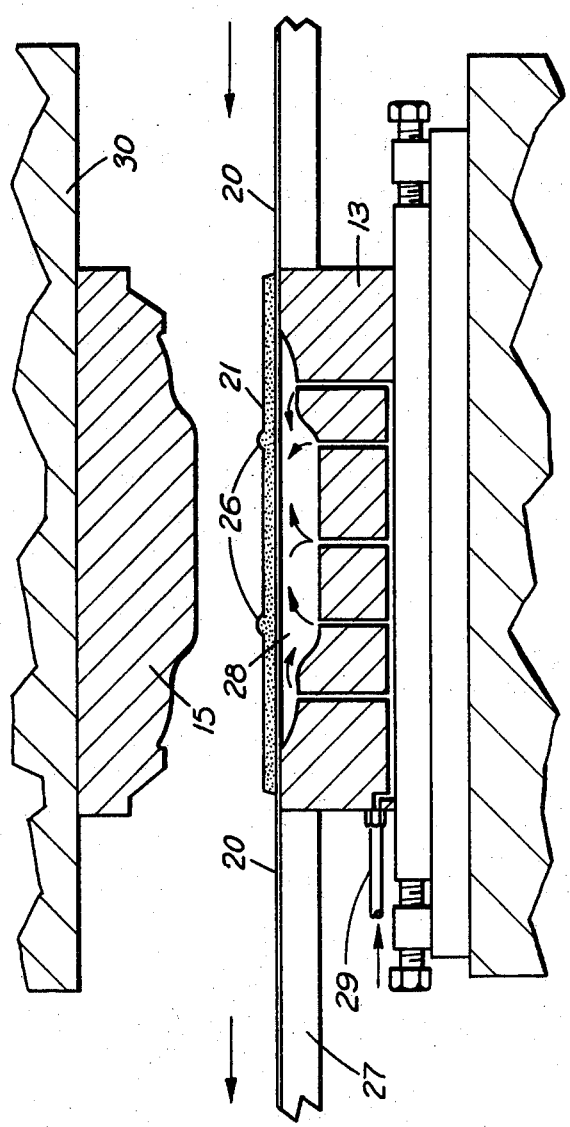
FIG. 5 is a sectional view of a molding station in the apparatus of FIG. 4.
Figure 6:
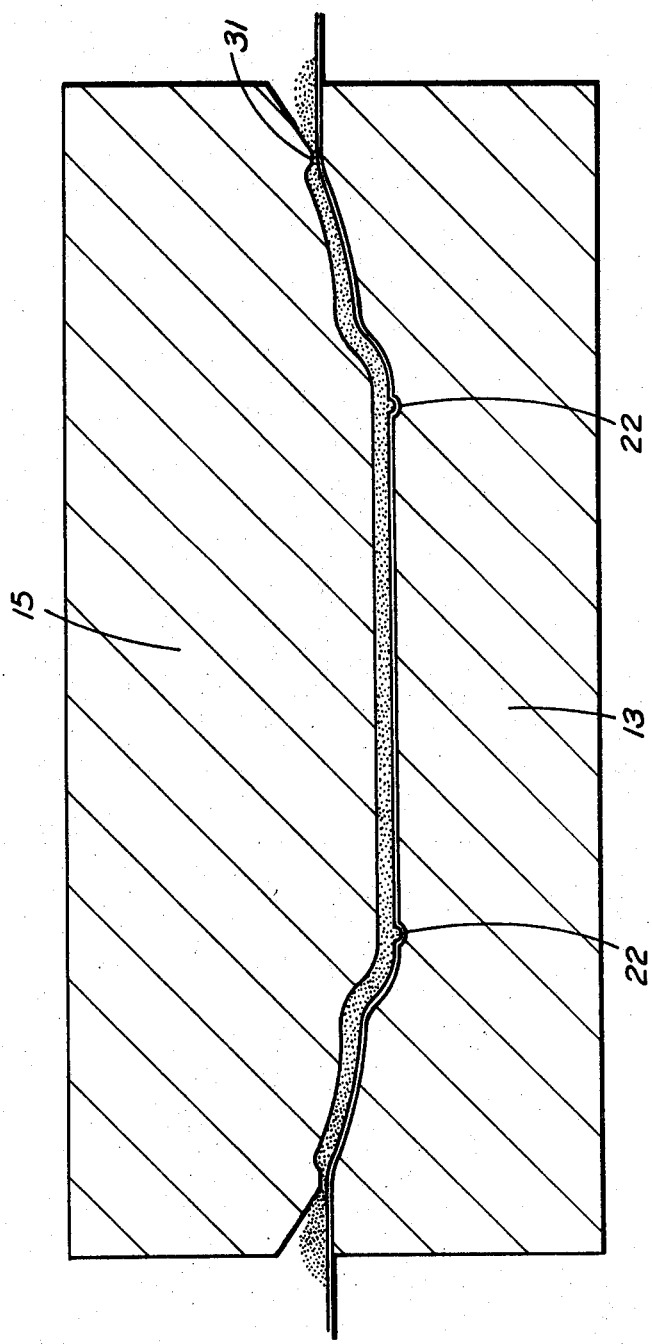
FIG. 6 is a simplified sectional view on a larger scale of the mold shown in FIG. 5 in a closed position.

As an alternative to machining to obtain a smooth finish, articles may be molded with a smooth finish by employing the apparatus illustrated in FIGS. 4 to 6, using an elastomeric sheet having a thickness which is not greater (and preferably less) than the granular size of the mix, holding the sheet in tension to avoid creasing during the process steps of mix deposition and molding. Referring now to FIGS. 4 to 6, a bone china mix is prepared by blunging, filter pressing, deflocculating with the addition of water to form a 70% solids content slip which is then spray dried to a moisture content of 7–8% and a granular size of 250 microns and finer. The granular mix is distributed by a shuttle box (not shown) onto a tensioned, smooth surfaced, 100-micron thick polyvinyl chloride (PVC) sheet 20 for the production of an 18 cm. diameter plate. The shuttle box provides a uniform layer 21 of mix on a flat surface. In the case of the plate, extra mix is desired for a foot 22 (the annular rim on the underside of the plate, FIG. 6).

Accordingly there is provided a suction box 23, FIG. 4, with an annular recess 24 at the mix distribution station. Vacuum is applied through small holes 25 in the suction box to pull the PVC sheet 20 into the recess. Mix delivered by the shuttle box therefore forms a uniform layer except for the greater depth at the annular recess 24. Release of vacuum plus slight low pressure air to break the seal between the suction box 23 and the PVC sheet 20 allows the PVC sheet 20 to straighten out and transfers the annulus of extra mix to the upper side of the layer of mix to form an annulus 26 on the upper surface of the layer 21 of mix. The PVC sheet 20 moves over a table 27 to the molding station where it is supported over a mold cavity 28 by being held in tension and by low pressure air fed into the cavity.

Pressing occurs as described with reference to FIGS. 1 and 2 except that with a metal female die 13, there is no isostatic effect with the very thin sheet 20. This situation can of course be remedied, as noted above, by the use of rubber for the female die 13. Faster production rates are obtained by the use of vacuum applied to the cavity 28 at the moment male die 15 touches the mix in its downward travel. It is preferred to use vacuum applied through a connection 29 in this way and to actuate a vacuum valve by an adjustable control fitted to the upper press platen 30. The connection 29 also serves to enable the low pressure air to enter the cavity 28. In some cases, it is preferred to perform the mix by evacuating the space within the lower female die, below the rubber sheet and mix, prior to the application of any pressure by the male die (rather than simultaneously with such pressure). This is of course workable only when the moldable mix has an angle of repose at least as great as the greatest angle of the side of any recess in the mold. Otherwise, the mix would fall and lose its shape when preformed.

The nip design 17 in FIG. 2 is modified to a flat area 31 (see FIG. 6) for use with very thin conveyor belts.

The plates produced were found to be as smooth as the steel mold surface and were biscuit fired, glazed and glost fired in the normal way without the need for any further smoothing operation on the underside, i.e., the side in contact with the PVC sheet.

Articles made according to this invention in metal would undergo normal sintering processes, plastics would be heat cured as required and composites would undergo whatever heat treatment was appropriate to their composition.

We claim:
1. A method of molding a shaped article from a moldable raw mix, comprising the steps of
  (1) positioning a rubber sheet in the form of a conveyor belt to allow travel through the molding position between a lower female die and a cooperating upper male die of the mold, and over a vacuum forming unit positioned opposite mix distributing means, said vacuum forming unit having a shaped lower surface, said shape corresponding to a desired non-uniform disposition of the mix on the rubber sheet; the thickness of said rubber sheet being not greater than the granular size of the mix, and said rubber sheet being held in tension to avoid creasing of the rubber sheet when the dies are later brought together;
  (2) forming a vacuum in the vacuum forming unit to shape and hold the rubber sheet on the shaped surface;
  (3) distributing a layer of mix on the rubber sheet, over the vacuum forming unit and outside the molding position of the mold;
  (4) releasing the vacuum within the vacuum forming unit, allowing the rubber to assume its normal flat position;
  (5) moving the rubber sheet, whereby to carry the mix in the desired non-uniform disposition into the molding position and over the lower female die of the mold;
  (6) evacuating the space within the lower female die, below the rubber sheet and mix, prior to bringing together the lower female and upper male dies;
  (7) bringing together the lower female die and the cooperating upper male die of the mold, forming a shaped article from the mix in the mold under pressure;
  (8) separating the dies, whereby to release the shaped article from the lower female die by the spring action of the rubber sheet;
  (9) moving the rubber sheet, whereby to carry the molded article out of the molding position after molding, simultaneously carry mix for a subsequent molded article into the molding position and over the lower female die of the mold; and
  (10) removing the molded article from the rubber sheet.

2. A method as claimed in claim 1, wherein an additional rubber sheet which is thinner than the first rubber sheet is provided on the top of the first rubber sheet, a lubricant being provided between the two rubber sheets; the mix being distributed on top of both rubber sheets.

3. A method as claimed in claim 1, wherein the rubber sheet is positioned to allow travel simultaneously through the molding positions of a plurality of molds, said sheet carrying mix into the molding positions and over the lower female dies of the plurality of molds, and later moving to carry a plurality of molded articles out of the molding positions.

References Cited

UNITED STATES PATENTS

| | | | |
|---|---|---|---|
| 1,641,553 | 9/1927 | Schemmel | 264—316 |
| 2,345,112 | 3/1944 | Grundel | 264—90 X |
| 2,354,916 | 8/1944 | Hurt | 264—90 |
| 2,830,818 | 4/1958 | Otto | 264—92 X |
| 3,207,821 | 9/1965 | Jones-Hinton et al. | 264—92 |
| 3,604,053 | 9/1971 | Zemlin | 264—316 X |
| 1,863,854 | 6/1932 | Jeffery | 264—313 X |
| 3,173,974 | 3/1965 | Mohr | 264—313 X |
| 3,520,961 | 7/1970 | Suda et al. | 264—313 X |

FOREIGN PATENTS

| | | | |
|---|---|---|---|
| 283,685 | 1/1928 | Great Britain | 264—316 |

ROBERT F. WHITE, Primary Examiner

J. H. SILBAUGH, Assistant Examiner

U.S. Cl. X.R.

264—90, 316, 334, DIG. 78; 425—256, 363, 405